(12) United States Patent
Rivett et al.

(10) Patent No.: US 8,136,997 B2
(45) Date of Patent: Mar. 20, 2012

(54) MULTI-PIECE SPACER FOR SETTING BEARING PRELOAD

(75) Inventors: Eric Alan Rivett, Troy, MI (US); Mike Bommarito, Rochester Hills, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 400 days.

(21) Appl. No.: 12/409,606

(22) Filed: Mar. 24, 2009

(65) Prior Publication Data

US 2010/0247016 A1  Sep. 30, 2010

(51) Int. Cl.
*F16C 19/22* (2006.01)
(52) U.S. Cl. ................... 384/551; 384/519
(58) Field of Classification Search ............ 384/551, 384/559, 562, 563, 571, 510, 517, 519, 537, 384/540; 403/369, 370, 374.4
See application file for complete search history.

(56) References Cited

U.S. PATENT DOCUMENTS

| | | | |
|---|---|---|---|
| 748,825 A | 1/1904 | Webb | |
| 1,399,959 A * | 12/1921 | Hanson | ............... 384/517 |
| 2,407,532 A | 9/1946 | Boden | |
| 2,702,868 A | 2/1955 | Kindig | |
| 3,516,717 A | 6/1970 | Peterson | |
| 3,746,412 A | 7/1973 | Hay | |
| 3,901,568 A | 8/1975 | Gadd et al. | |
| 3,934,957 A | 1/1976 | Derner | |
| 4,085,984 A * | 4/1978 | Cameron | ............... 384/563 |
| 4,172,621 A * | 10/1979 | Yoshida | ............... 384/563 |
| 4,576,503 A * | 3/1986 | Orain | ............... 403/370 |
| 4,901,523 A | 2/1990 | Huelster | |
| 5,046,870 A | 9/1991 | Ordo | |
| 5,293,688 A | 3/1994 | Koch et al. | |
| 6,474,873 B1 | 11/2002 | Krisher et al. | |
| 6,935,788 B2 * | 8/2005 | Stanczak | ............... 384/551 |
| 6,971,802 B2 | 12/2005 | Vezina | |
| 2005/0245342 A1 | 11/2005 | Pontanari et al. | |

* cited by examiner

*Primary Examiner* — Michael P Ferguson
(74) *Attorney, Agent, or Firm* — Harness, Dickey & Pierce, P.L.C.

(57) ABSTRACT

A driveline assembly may include a driveline component housing, a pinion shaft located within the housing, a first bearing assembly, a second bearing assembly, a spacer assembly, and a load adjustment member. The spacer assembly may be located axially between the first and second bearing assemblies and may include first and second members. The first member may be axially fixed on the pinion shaft and may include an axial end defining a first generally conical surface. The second member may include a first axial end engaged with the second bearing assembly and a second axial end defining a second generally conical surface abutting the first generally conical surface. The load adjustment member may be axially displaceable relative to the pinion shaft to advance the second member axially along the first generally conical surface of the first member and adjust a preload on the second bearing assembly.

19 Claims, 5 Drawing Sheets

MULTI-PIECE SPACER FOR SETTING BEARING PRELOAD

FIELD

The present disclosure relates to vehicle driveline assemblies and more specifically to adjusting a bearing preload for pinion shafts.

BACKGROUND

This section provides background information related to the present disclosure which is not necessarily prior art.

Driveline assemblies may include bearings rotationally supporting a pinion shaft in a driveline component housing. For example, axle assemblies may include bearings rotationally supporting an input pinion in a differential carrier. A bearing preload may provide a torsional resistance between the input pinion and differential carrier. The bearing preload is typically controlled by a spacer located between a pair of bearing assemblies. In order to adjust the preload, spacers of different axial lengths are installed between the first and second bearing assemblies. During assembly, a first spacer may be located between the first and second bearing assemblies and the input pinion may be rotated to determine a torsional resistance. If the torsional resistance is not within a predetermined range, the spacer is removed and replaced by another spacer having a different axial length. The torsional resistance of the input pinion is again tested and compared to the predetermined range. This process is repeated until the measured torsional resistance is within the predetermined range. As a result, the assembly process can require numerous iterations of spacer installations, increasing assembly time and cost.

SUMMARY

This section provides a general summary of the disclosure, and is not a comprehensive disclosure of its full scope or all of its features.

A driveline assembly may include a driveline component housing, a pinion shaft located within the housing, a first bearing assembly, a second bearing assembly, a spacer assembly, and a load adjustment member. The first bearing assembly may include a first inner race supported on the pinion shaft, a first outer race supported in the housing, and a first bearing member therebetween. The second bearing assembly may include a second inner race supported on the pinion shaft, a second outer race supported in the housing, and a second bearing member therebetween. The spacer assembly may be located axially between the first and second bearing assemblies and may include first and second members. The first member may be axially fixed on the pinion shaft and may include an axial end defining a first generally conical surface. The second member may include a first axial end engaged with the second bearing assembly and a second axial end defining a second generally conical surface abutting the first generally conical surface. The load adjustment member may be axially displaceable relative to the pinion shaft to advance the second member axially along the first generally conical surface of the first member and adjust a preload on the second bearing assembly.

In another arrangement, a driveline assembly may include a driveline component housing, a pinion shaft defining a first axial stop, a first bearing assembly, a second bearing assembly, a spacer assembly, and a load adjustment member. The first bearing assembly may rotationally support the pinion shaft within the housing and may include a first inner race supported on the pinion shaft and abutting the first axial stop, a first outer race supported in the housing, and a first bearing member therebetween. The second bearing assembly may rotationally support the pinion shaft within the housing and may include a second inner race supported on the pinion shaft, a second outer race supported in the housing, and a second bearing member therebetween. The spacer assembly may be located axially between the first and second bearing assemblies and may include first and second members. The first member may be axially fixed on the pinion shaft and may include an axial end defining a first generally conical surface. The second member may include a first axial end engaged with the second inner race and a second axial end defining a second generally conical surface abutting the first generally conical surface. The load adjustment member may be engaged with the second inner race and may be axially displaceable relative to the input pinion to adjust a preload on the second bearing assembly. The load adjustment member may displace the second member of the spacer assembly from a first position axially toward the first inner race to a second position when the load adjustment member is displaced axially toward the first axial stop. The second bearing assembly may provide a first torsional resistance between the pinion shaft and the housing when the second inner race is in the first position and may provide a second torsional resistance between the pinion shaft and the housing greater than the first torsional resistance when the second inner race is in the second position.

A method of assembling a driveline assembly may include locating a first bearing assembly on a pinion shaft within a driveline component housing. Next, a spacer assembly including first and second members may be located on the pinion shaft. The first member may be axially fixed relative to the pinion shaft and may include an axial end defining a first generally conical surface. The second member may include a first axial end and a second axial end defining a second generally conical surface abutting the first generally conical surface. A second bearing assembly may be located on the pinion shaft adjacent to the spacer assembly and may abut the first axial end of the second member. The spacer assembly may be secured axially between the first and second bearing assemblies. A load adjustment member may be secured on the pinion shaft adjacent to the second bearing assembly. The spacer assembly and the second bearing assembly may be located axially between the first bearing assembly and the load adjustment member. The load adjustment member may be displaced axially along the pinion shaft to adjust a torsional resistance between the pinion shaft and the housing. The displacing may force the second member of the spacer assembly axially along the first generally conical surface of the first member from a first position to a second position. The load adjustment member may provide a first torsional resistance between the housing and the pinion shaft when the second member is in the first position and a second torsional resistance greater than the first torsional resistance when the second member is in the second position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
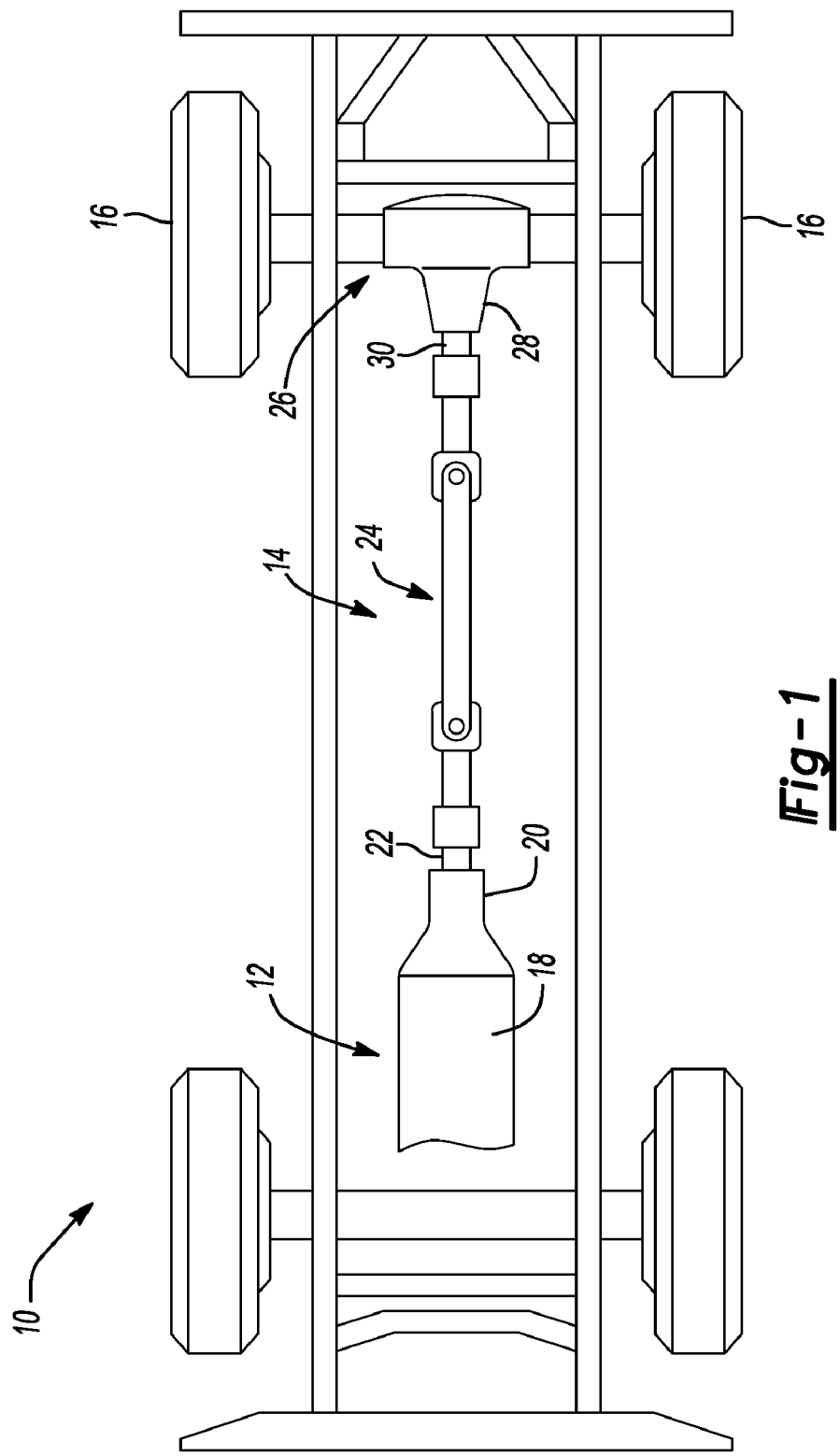
FIG. 1 is a schematic illustration of a vehicle according to the present disclosure.

With reference to FIG. 1, a vehicle 10 may include a powertrain 12, a driveline 14, and wheels 16. The driveline 14 may be driven by the powertrain 12 and may drive the wheels 16. The powertrain 12 may include an engine 18 and a transmission 20. The transmission 20 may include an output shaft 22 engaged with the driveline 14.

The engine 18 may be mounted in an in-line or longitudinal orientation along the axis of the vehicle 10. The output of the engine 18 may be coupled to the transmission 20 via a clutch (not shown) to transmit rotary power from the engine 18 to the transmission 20. The rotary power may be transmitted from the output shaft 22 of the transmission 20 to the driveline 14. The driveline 14 may include a propshaft assembly 24 driven by the output shaft 22 of the transmission 20 and driving rotation of the wheels 16 via the rear axle assembly 26.

Figure 2:
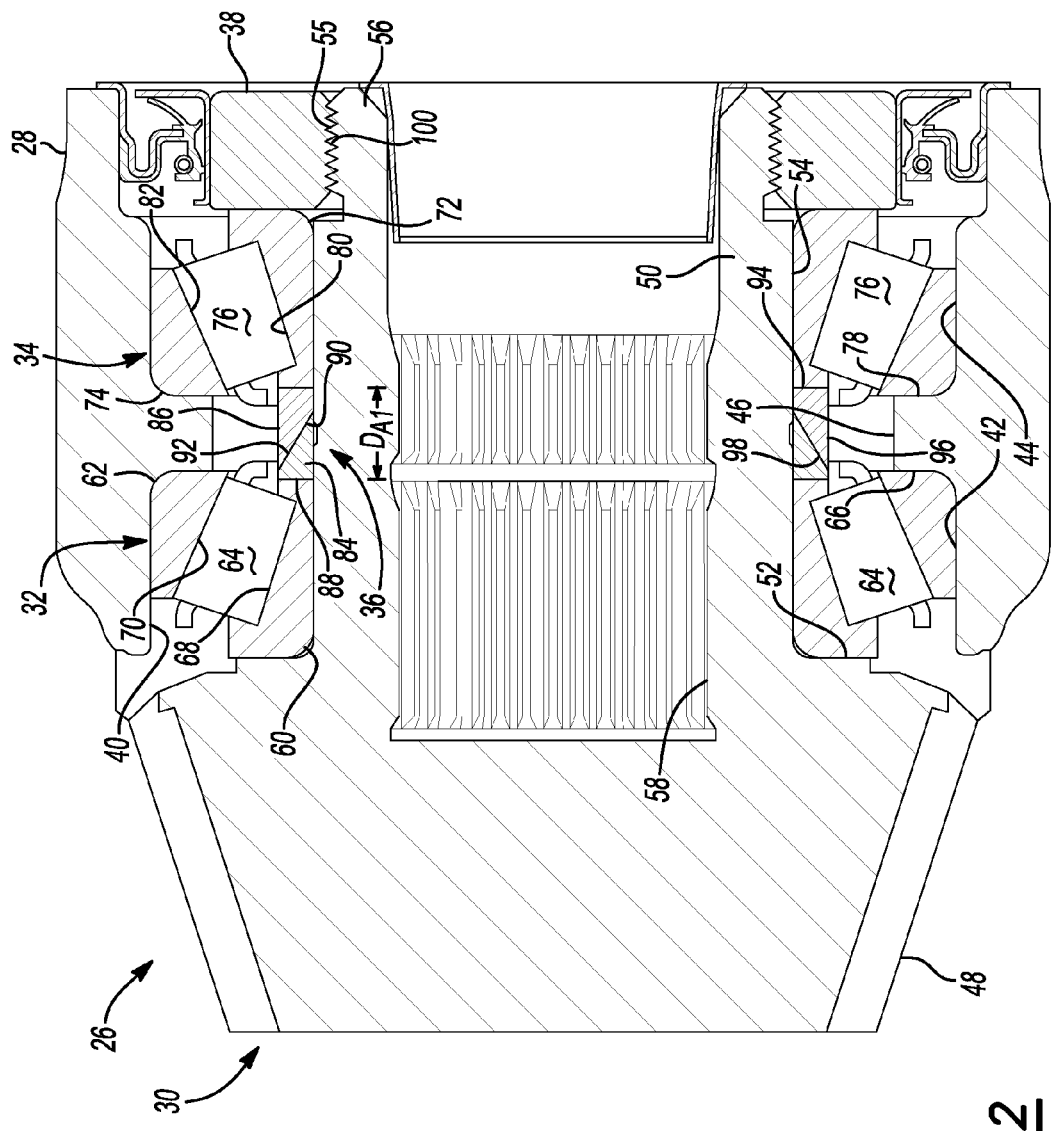
FIG. 2 is a fragmentary section view of the driveline assembly of FIG. 1 illustrating a first bearing preload.
Figure 3:
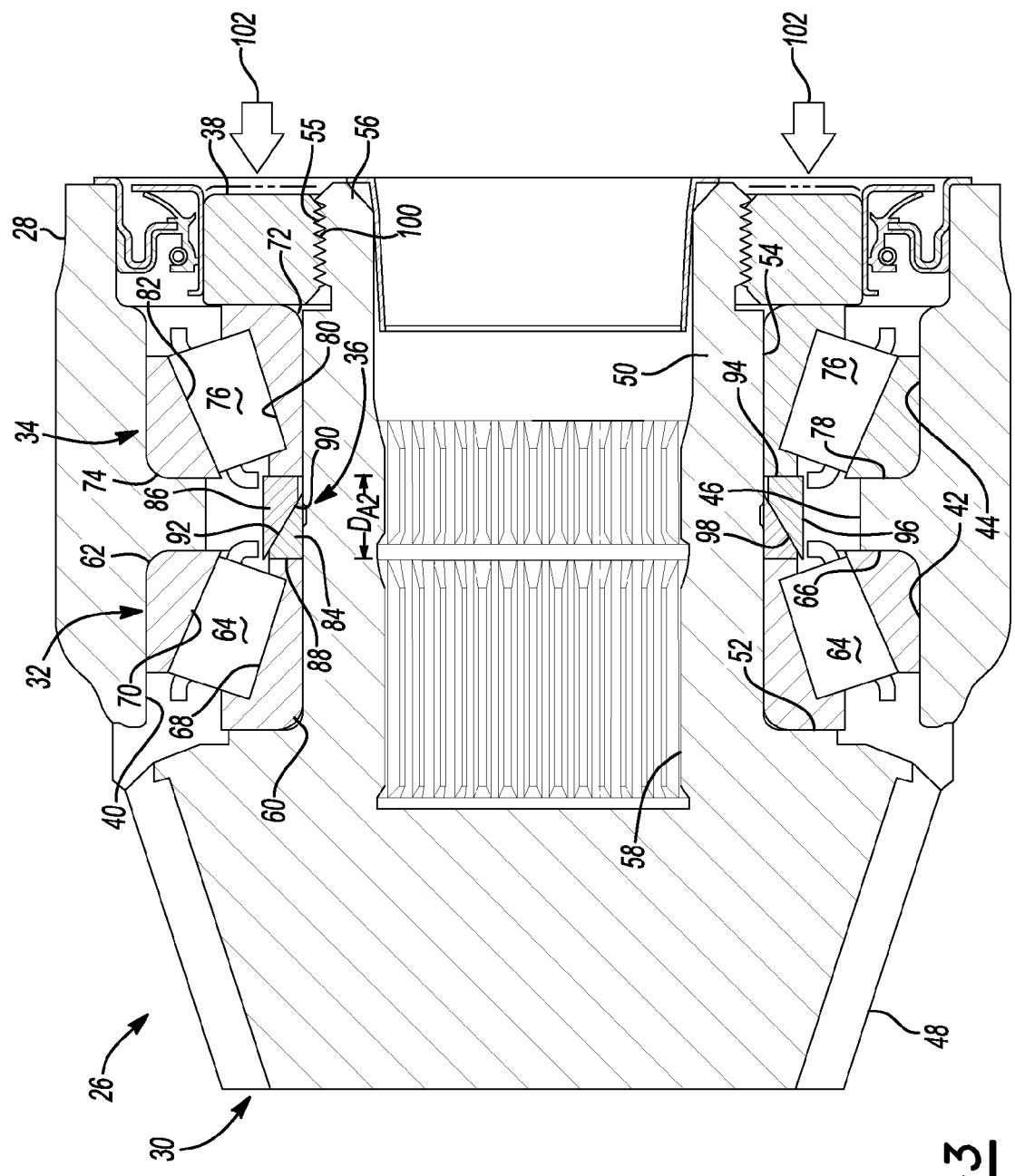
FIG. 3 is a fragmentary section view of the driveline assembly of FIG. 1 illustrating a second bearing preload.

With additional reference to FIGS. 2 and 3, the rear axle assembly 26 may include a differential carrier 28, a pinion shaft 30, first and second bearing assemblies 32, 34, a spacer assembly 36 and a load adjustment member 38. The differential carrier 28 may form a driveline component housing including a radially inner surface 40 separated into first and second portions 42, 44 by a radially inwardly extending wall 46. The pinion shaft 30 may be located within the differential carrier 28 and may include a gear portion 48 and a shaft portion 50. While described with respect to an axle assembly, it is understood that the present disclosure is not limited to axle assemblies and applies equally to a variety of driveline component housings having bearings rotationally supporting a shaft therein, such as power transfer units and front and rear axles.

Figure 4:
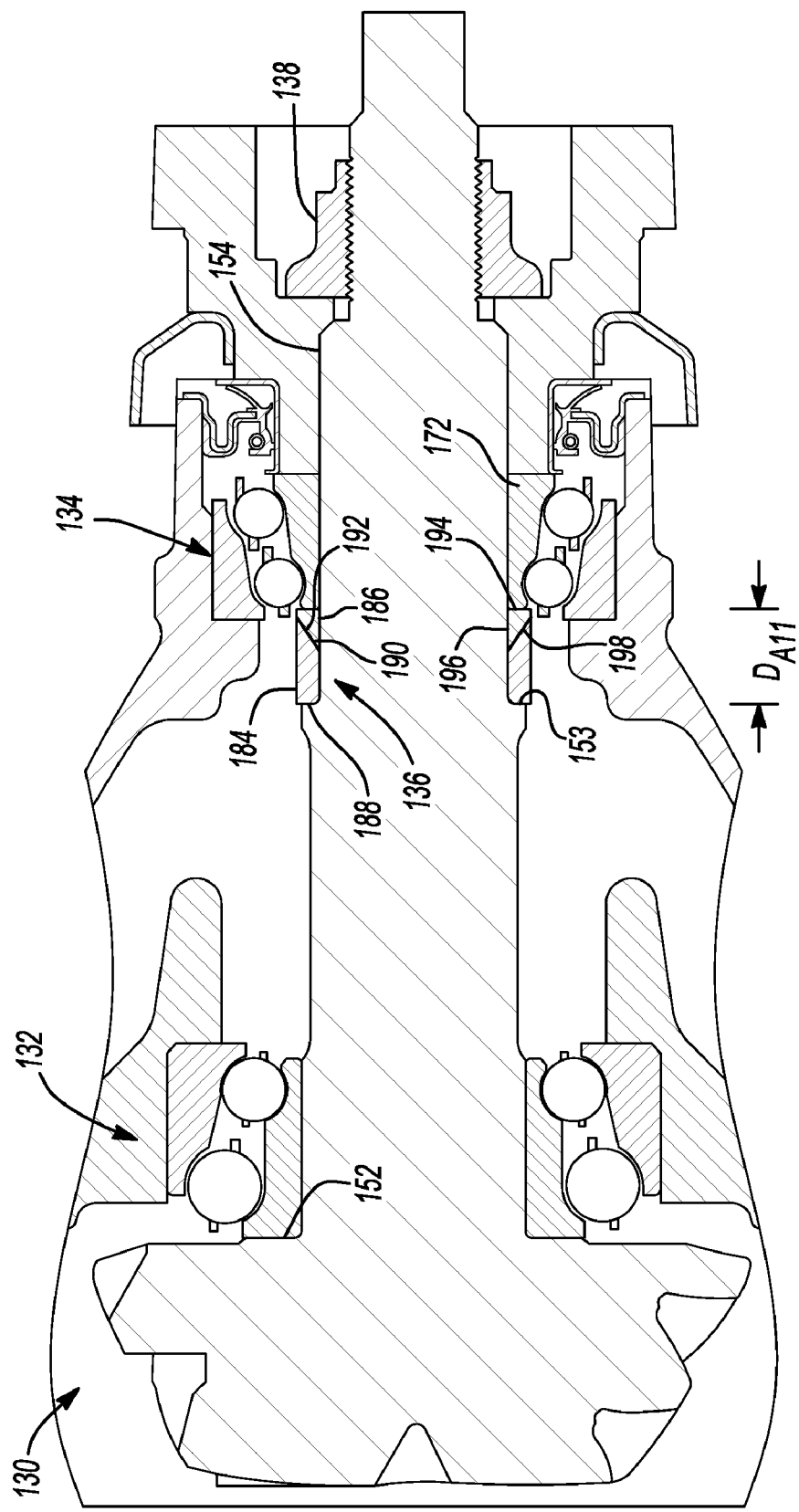
FIG. 4 is a fragmentary section view of an alternate driveline assembly according to the present disclosure illustrating a first bearing preload.
Figure 5:
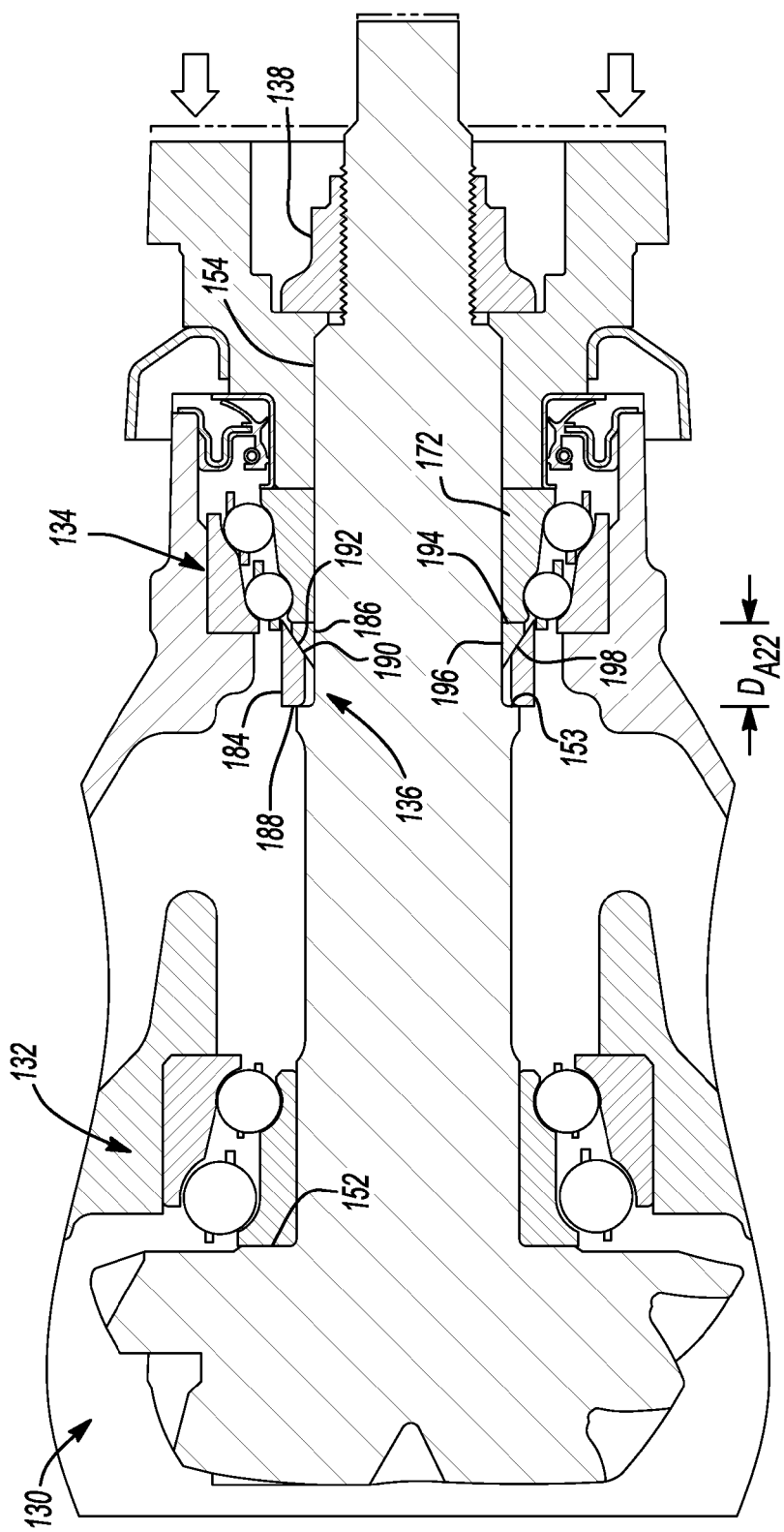
FIG. 5 is a fragmentary section view of the driveline assembly of FIG. 4 illustrating a second bearing preload.

The gear portion 48 may be drivingly engaged with a differential assembly (not shown). The shaft portion 50 may be engaged with and rotationally driven by the propshaft assembly 24. A wall (or first axial stop) 52 may be defined at an interface between the gear portion 48 and the shaft portion 50. The shaft portion 50 may include an outer radial surface 54. The outer radial surface 54 may include a first spiral thread 55 thereon at an end 56 of the shaft portion 50 generally opposite the gear portion 48. The shaft portion 50 is illustrated as including a splined inner bore 58. However, it is understood that the present disclosure is not limited to the arrangement shown and applies equally to input pinions having splined outer surfaces as illustrated in FIGS. 4 and 5.

The first and second bearing assemblies 32, 34 may each be in the form of tapered roller bearings. However, it is understood that the present disclosure is not limited to tapered roller bearings and applies equally to a variety of other bearing assemblies such as roller ball bearing assemblies, as illustrated in FIGS. 4 and 5. The first bearing assembly 32 may include a first inner race 60, a first outer race 62, and first bearing members 64 disposed therebetween. The first inner race 60 may abut the first axial stop 52, axially securing the first inner race 60 relative to the shaft portion 50. The first outer race 62 may be secured on the radially inner surface 40 of the differential carrier 28 and may abut a first axial end 66 of the wall 46. The first inner race 60 may include a radially outer ramped surface 68 and the first outer race 62 may include a radially inner ramped surface 70 surrounding the radially outer ramped surface 68.

The second bearing assembly 34 may include a second inner race 72, a second outer race 74, and second bearing members 76 disposed therebetween. The second inner race 72 may be located axially between the first inner race 60 and the end 56 of the shaft portion 50 and may be axially displaceable thereon. The second outer race 74 may be secured on the radially inner surface 40 of the differential carrier 28 and may abut a second axial end 78 of the wall 46 generally opposite the first axial end 66. The second axial end 78 of the wall 46 may define a second axial stop. The second inner race 72 may include a radially outer ramped surface 80 and the second outer race 74 may include a radially inner ramped surface 82 surrounding the radially outer ramped surface 80.

The spacer assembly 36 may be located on the outer radial surface 54 of the shaft portion 50 axially between the first and second inner races 60, 72. The spacer assembly 36 may include first and second members 84, 86. The first member 84 may be axially fixed relative to the pinion shaft 30 and may include first and second axial ends 88, 90. The first axial end 88 may abut the first bearing assembly 32. More specifically, the first axial end 88 may abut the first inner race 60. However, the spacer assembly 36 may alternatively be axially spaced from the first bearing assembly 32, as discussed below with respect to FIGS. 4 and 5. The second axial end 90 may define a generally conical outer surface 92.

The second member 86 may include first and second axial ends 94, 96. The first axial end 94 may be engaged with the second bearing assembly 34. More specifically, the first axial end 94 may abut the second bearing assembly 34. For example, the first axial end 94 may abut the second inner race 72. The second axial end 96 may define a generally conical inner surface 98. The generally conical outer surface 92 may abut generally conical inner surface 98. The first and second members 84, 86 may each include generally solid annular bodies formed from a common material. By way of non-limiting example, the first and second members 84, 86 may each be formed from steel. It is understood that the first and second members 84, 86 may be reversed as discussed below with respect to FIGS. 4 and 5.

The load adjustment member 38 may be located on the end 56 of the shaft portion 50. The load adjustment member 38 may include a pinion nut defining an inner bore having a second spiral thread 100 therein. The end 56 of the shaft portion 50 may be located within the bore of the load adjustment member 38 and the first and second spiral threads 55, 100 may be engaged with one another. The load adjustment member 38 may be advanced axially along the shaft portion 50 from a first axial position (seen in FIG. 2) to a second axial position indicated by arrows 102 (seen in FIG. 3) by rotating the load adjustment member 38 relative to the shaft portion 50. It is understood that the displacement from the first position to the second position in FIGS. 2 and 3 is exaggerated for illustration purposes.

The first and second inner races 60, 72 may be located axially between the first axial stop 52 and the load adjustment member 38. A bearing preload may be adjusted by axially displacing the load adjustment member 38 relative to the pinion shaft 30. More specifically, during assembly the first bearing assembly 32 may be located on the pinion shaft 30. The first inner race 60 may abut the first axial stop 52 on the pinion shaft 30 after being located thereon. After the first bearing assembly 32 is located on the pinion shaft 30, the spacer assembly 36 may be located on the pinion shaft 30. The first member 84 may be axially fixed relative to the pinion shaft 30. In the example shown in FIGS. 2 and 3, the first axial end 88 of the first member 84 may abut the first inner race 60 after the spacer assembly 36 is located on the pinion shaft 30. Next, the second bearing assembly 34 may be located on the pinion shaft 30 and may abut first axial end 94 of the second member 86, locating the spacer assembly 36 axially between the first and second bearing assemblies 32, 34. The load adjustment member 38 may then be secured to the pinion shaft 30 adjacent to and abutting the second inner race 72.

The load adjustment member 38 may be displaced axially along the pinion shaft 30 to adjust a torsional resistance between the pinion shaft 30 and the differential carrier 28. As discussed above, the load adjustment member 38 may include a pinion nut and may be axially displaced by rotation relative to the pinion shaft 30. As the load adjustment member 38 is displaced axially toward the first axial stop 52 on the pinion shaft 30, the load adjustment member 38 may displace the second inner race 72 and force the second member 86 of the spacer assembly 36 axially along the conical outer surface 92 of the first member 84 from the first axial position (seen in FIG. 2) to the second axial position (seen in FIG. 3). The spacer assembly 36 may define a first axial distance ($D_{A1}$) between the first and second bearing assemblies 32, 34 when in the first axial position and may define a second axial distance ($D_{A2}$) between the first and second bearing assemblies 32, 34 when the second member 86 is in the second axial position. The second axial distance ($D_{A2}$) may be less than the first axial distance ($D_{A1}$). The second member 86 may be displaced radially outward in the second position relative to the first position.

The bearing preload may be adjusted by displacing the second inner race 72 as discussed above. More specifically, the bearing preload on the second bearing assembly 34 may be increased as the second inner race if forced axially inward toward the first axial stop 52, reducing a clearance between the second inner race 72 and the second outer race 74. The radial spacing between the outer ramped surface 80 of the second inner race 72 and the inner ramped surface 82 of the second outer race 74 may be reduced as the second inner race 72 is displaced from the first axial position (seen in FIG. 2) to the second axial position (seen in FIG. 3). The reduced spacing may provide an increased torsional resistance between the pinion shaft 30 and the differential carrier 28.

Once assembled as discussed above, the load adjustment member 38 may be in a first (or initial) axial position. The pinion shaft 30 may be rotated relative to the differential carrier 28. The torque required to rotate the pinion shaft 30 may be measured, providing a first torsional resistance measurement. The first torsional resistance may be compared to a predetermined torsional resistance. If the first torsional resistance is not within the predetermined torsional resistance, the load adjustment member 38 may be adjusted without removing the spacer assembly 36. For example, if the first torsional resistance is less than the predetermined torsional resistance, the load adjustment member 38 may be advanced axially toward the first axial stop 52 to increase the torsional resistance between the pinion shaft 30 and the differential carrier 28. If the first torsional resistance is greater than the predetermined torsional resistance, the load adjustment member 38 may be displaced axially away from the first axial stop 52 to reduce the torsional resistance between the pinion shaft 30 and the differential carrier 28.

As discussed above, and illustrated in FIGS. 4 and 5, an alternative arrangement may include first and second bearing assemblies 132, 134 in the form of tandem roller ball bearing assemblies and a spacer assembly 136 axially spaced from the first bearing assembly 132 and having the first and second members 184, 186 reversed relative to the spacer assembly 36 discussed above.

Operation may be generally similar to that described above with the exceptions noted below. The pinion shaft 130 may include a second axial stop 153 extending radially from the outer radial surface 154. The first member 184 of the spacer assembly 136 may be axially fixed relative to the pinion shaft 130 by abutting the second axial stop 153 rather than the first bearing assembly 132. More specifically, the first axial end 188 may abut the second axial stop 153. The second axial end 190 may define a generally conical inner surface 192.

The second member 186 may include first and second axial ends 194, 196. The first axial end 194 may be engaged with the second bearing assembly 134. More specifically, the first axial end 194 may abut the second bearing assembly 134. For example, the first axial end 194 may abut the second inner race 172. The second axial end 196 may define a generally conical outer surface 198. The generally conical inner surface 192 may abut the generally conical outer surface 198.

As the load adjustment member 138 is displaced axially toward the first axial stop 152 on the pinion shaft 130, the load adjustment member 138 may displace the second inner race 172 and force the second member 186 of the spacer assembly 136 axially along the conical inner surface 192 of the first member 184 from the first axial position (seen in FIG. 4) to the second axial position (seen in FIG. 5). It is understood that the displacement from the first position to the second position in FIGS. 4 and 5 is exaggerated for illustration purposes. The spacer assembly 136 may define a first axial distance ($D_{A11}$) between the second axial stop 153 and the second inner race 172 when in the first axial position and may define a second axial distance ($D_{A22}$) between the second axial stop 153 and the second inner race 172 when in the second axial position. The second axial distance ($D_{A22}$) may be less than the first axial distance ($D_{A11}$). The first member 184 may be displaced radially outward in the second position relative to the first position.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:
1. A driveline assembly comprising:
   a driveline component housing;
   a pinion shaft located within the housing;
   a first bearing assembly including a first inner race supported on the pinion shaft, a first outer race supported in the housing, and a first bearing member therebetween;
   a second bearing assembly including a second inner race supported on the pinion shaft, a second outer race supported in the housing, and a second bearing member therebetween, wherein the second outer race is axially fixed relative to the housing;

a spacer assembly located axially between the first and second bearing assemblies and including first and second members, the first member axially fixed on the pinion shaft and including an axial end defining a first generally conical surface, the second member including a first axial end engaged the second inner race of with the second bearing assembly and a second axial end defining a second generally conical surface abutting the first generally conical surface; and a load adjustment member engaged with the second bearing assembly and axially displaceable relative to the pinion shaft to advance the second member axially along the first generally conical surface of the first member and adjust a preload on the second bearing member of the second bearing assembly, axial displacement of the load adjustment member displacing the second member of the spacer axially and along the first generally conical surface to adjust a preload on the second bearing member of the second bearing assembly.

2. The driveline assembly of claim 1, wherein the pinion shaft includes an axial stop extending radially outward from an outer surface thereof, the first and second inner races being supported on the outer surface axially between the load adjustment member and the axial stop.

3. The driveline assembly of claim 2, wherein the first inner race abuts the axial stop and the second inner race abuts the load adjustment member.

4. The driveline assembly of claim 1, wherein the second inner race is displaceable between first and second positions by axial displacement of the load adjustment member, the second bearing assembly providing a first torsional resistance between the pinion shaft and the housing when the second inner race is in the first position and providing a second torsional resistance greater than the first torsional resistance between the pinion shaft and the housing when the second inner race is in the second position.

5. The driveline assembly of claim 4, wherein the first generally conical surface includes a generally conical outer surface and the second generally conical surface includes a generally conical inner surface.

6. The driveline assembly of claim 5, wherein the first member of the spacer assembly forms a first annular body and the second member forms a second annular body, the second member being displaced radially outward from and axially toward the first member as the second inner race is displaced from the first position to the second position.

7. The driveline assembly of claim 4, wherein the first generally conical surface includes a generally conical inner surface and the second generally conical surface includes a generally conical outer surface.

8. The driveline assembly of claim 7, wherein the first member of the spacer assembly forms a first annular body and the second member forms a second annular body, the second member being displaced axially toward the first member and the first member being displaced radially outward from the second member as the second inner race is displaced from the first position to the second position.

9. The driveline assembly of claim 1, wherein the first member includes a first annular body and the second member includes a second annular body, the first and second annular bodies being generally solid members formed from a common material.

10. The driveline assembly of claim 1, wherein the spacer assembly biases the second inner race axially outward from the first inner race.

11. The driveline assembly of claim 1, wherein the pinion shaft includes an outer surface having a first spiral thread thereon, the load adjustment member including a pinion nut defining a bore having a second spiral thread therein and engaged with the first spiral thread, the load adjustment member being axially displaced by rotation of the pinion nut relative to the pinion shaft.

12. A driveline assembly comprising:

a driveline component housing;

a pinion shaft located within the housing and defining a first axial stop;

a first bearing assembly rotationally supporting the pinion shaft within the housing and including a first inner race supported on the pinion shaft and abutting the first axial stop, a first outer race supported in the housing, and a first bearing member therebetween;

a second bearing assembly rotationally supporting the pinion shaft within the housing and including a second inner race supported on the pinion shaft, a second outer race supported in the housing, and a second bearing member therebetween, wherein the second outer race is axially fixed relative to the housing;

a spacer assembly located axially between the first and second bearing assemblies and including first and second members, the first member axially fixed on the pinion shaft and including an axial end defining a first generally conical surface, the second member including a first axial end engaged with the second inner race and a second axial end defining a second generally conical surface abutting the first generally conical surface; and a load adjustment member engaged with the second inner race and being axially displaceable relative to the pinion shaft to adjust a preload on the second bearing member of the second bearing assembly, the load adjustment member displacing the second member of the spacer assembly along the first generally conical surface from a first position axially toward the first inner race to a second position when the load adjustment member is displaced axially toward the first axial stop with the first and second generally conical surfaces abutting one another when the second member of the spacer is in the first and second positions to adjust a preload on the second bearing member of the second bearing assembly, the second bearing assembly providing a first torsional resistance between the pinion shaft and the housing when the second member is in the first position and providing a second torsional resistance between the pinion shaft and the housing greater than the first torsional resistance when the second member is in the second position.

13. The driveline assembly of claim 12, wherein the housing defines a second axial stop, the second outer race abutting the second axial stop to axially fix the second outer race as the second inner race is displaced from the first position to the second position.

14. The driveline assembly of claim 12, wherein the first member of the spacer assembly is axially fixed as the second inner race is displaced from the first position to the second position.

15. The driveline assembly of claim 12, wherein the second member of the spacer assembly is displaced radially outward when the load adjustment member is displaced axially toward the first axial stop.

16. The driveline assembly of claim 15, wherein the first member of the spacer assembly includes a first annular body and the second member includes a second annular body.

17. The driveline assembly of claim 12, wherein the first member of the spacer assembly is displaced radially outward when the load adjustment member is displaced axially toward the first axial stop.

18. A method comprising:
- locating a first bearing assembly on a pinion shaft within a housing of a driveline assembly;
- locating a spacer assembly including first and second members on the pinion shaft, the locating axially fixing the first member relative to the pinion shaft, the first member including an axial end defining a first generally conical surface and the second member including a first axial end and a second axial end defining a second generally conical surface abutting the first generally conical surface;
- locating a second bearing assembly on the pinion shaft adjacent to the spacer assembly and engaging the first axial end of the second member with the second bearing assembly, wherein the second bearing assembly includes an inner race, an outer race and a bearing member located therebetween, wherein the second outer race is axially fixed relative to the housing and the first axial end of the second member is engaged with the second inner race, the spacer assembly being secured axially between the first and second bearing assemblies;
- securing a load adjustment member on the pinion shaft adjacent to the second bearing assembly, the spacer assembly and the second bearing assembly being located axially between the first bearing assembly and the load adjustment member; and
- displacing the load adjustment member axially along the pinion shaft to adjust a torsional resistance between the pinion shaft and the housing, the displacing forcing the second member of the spacer assembly axially and along the first generally conical surface of the first member from a first position to a second position, the load adjustment member providing a first torsional resistance between the housing and the pinion shaft when the second member is in the first position and a second torsional resistance greater than the first torsional resistance when the second member is in the second position to adjust a preload on the bearing member of the second bearing assembly.

19. The method of claim 18, wherein the displacement of the load adjustment member includes axial displacement of the inner race relative to the outer race to create a reduced clearance between the inner and outer races.

* * * * *

UNITED STATES PATENT AND TRADEMARK OFFICE
CERTIFICATE OF CORRECTION

| | | |
|---|---|---|
| PATENT NO. | : 8,136,997 B2 | Page 1 of 1 |
| APPLICATION NO. | : 12/409606 | |
| DATED | : March 20, 2012 | |
| INVENTOR(S) | : Eric Alan Rivett et al. | |

It is certified that error appears in the above-identified patent and that said Letters Patent is hereby corrected as shown below:

Column 7, Line 8, Claim 1, "the second inner race of with" should be
--with the second inner race of--

Signed and Sealed this
Eighteenth Day of September, 2012

David J. Kappos
*Director of the United States Patent and Trademark Office*